Feb. 11, 1958  R. L. FRANK  2,823,377
TIMING APPARATUS
Filed March 28, 1956
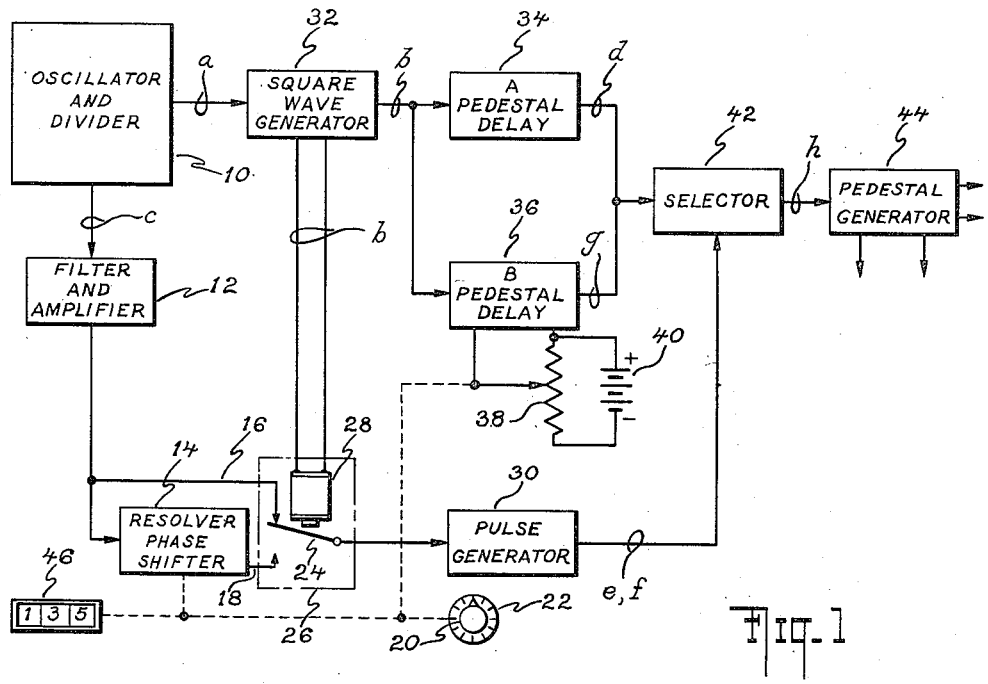
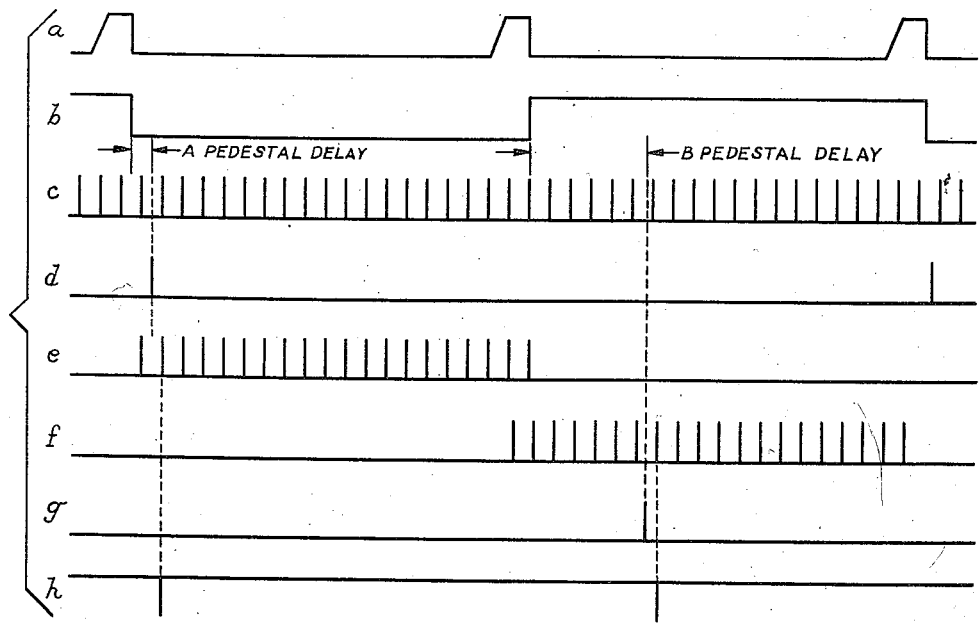
INVENTOR
ROBERT L. FRANK
BY
ATTORNEY United States Patent Office 2,823,377
Patented Feb. 11, 1958

2,823,377
TIMING APPARATUS

Robert L. Frank, Great Neck, N. Y., assignor to Sperry Rand Corporation, a corporation of Delaware Application March 28, 1956, Serial No. 574,398

7 Claims. (Cl. 343—103)

This invention relates generally to timing apparatus, and more particularly, is concerned with apparatus for measuring the time delay between two pulse trains, as in a hyperbolic navigation receiver such as a loran receiver.

In a hyperbolic navigation system, a line of position is determined by measuring the time difference between pulse trains received from two remote transmitting stations. These pulse trains are generally referred to as the master or A pulses and the slave or B pulses. Both the A and B pulses have the same repetition frequency. A loran receiver, such as described in Patent No. 2,651,033 to W. Frantz measures the time interval between the received A and B pulses by generating local pedestal pulses that are synchronized with the received A pulses and generating delayed pedestal pulses that are synchronized with the B pulses, the time delay between the A pedestal and B pedestal being then an indication of the time interval between the received A and B pulses.

While both the A delay circuit and B delay circuit of the loran receiver as described in the above-mentioned patent are synchronized from a single local oscillator, each contains fixed time delays and phase shifts in their circuitry that are or may be affected differently by changes in temperature, aging, and other factors that may alter to a different degree the total delay introduced by the respective A pedestal delay and B pedestal delay circuits.

It is therefore the general object of this invention to avoid and overcome the foregoing and other difficulties in and objections to the prior art practices by the provision of improved apparatus for measuring the time interval between received A and B pulses in a loran receiver.

Another object of this invention is the provision of apparatus for generating A pedestals and B pedestals in a loran receiver with greater accuracy and stability.

Another object of this invention is to provide timing apparatus in which all circuits that may introduce phase or delay errors in both the A pedestal and B pedestal are common to both the A pedestal and B pedestal generating circuits so that such errors are cancelled out.

Another object of the invention is the provision of apparatus for generating pairs of pulses which are accurately separated in time by an amount that is proportional to the angular position of a shaft.

These and other objects of the invention which will become apparent as the description proceeds are achieved by the provision of a local oscillator and divider chain from which is derived a first signal having a fixed frequency. A variable phase shifter responsive to the first signal provides a second signal of the same frequency but variable in phase with respect to the first signal. A pulse generating circuit is selectively coupled by switching means to the first or second signals whereby the output pulses from the pulse generating means are synchronized in time with the cycles of the first signal or the cycles of the delayed second signal. A square wave generator responsive to the output of the divider chain actuates the switching means. A first delayed trigger is derived from the output of the square wave generator and a variably delayed trigger is also derived from the square wave generator output, the difference in time between the two triggers being adjusted to approximately correspond to a desired time interval. A selector circuit selects pulses from the pulse generating means in response to the triggers, the selected pulses being synchronized with the first and second pulses and therefore having an accurately determined time relation by virtue of the variable phase shifter, which is calibrated to indicate the selected time interval.

For a better understanding of the invention reference should be had to the accompanying drawing, wherein:

Fig. 1 is a block diagram of a preferred embodiment of the present invention; and Fig. 2 is a series of waveforms showing the shapes and time relationship of the various signals appearing in the circuit of Fig. 1.

The preferred embodiment of the invention as hereinafter described in connection with Figs. 1 and 2 is particularly adapted for use in a loran receiver of the type described in the above-mentioned Frantz patent. The frequencies and pulse rates are given in terms of standard loran systems by way of example. However, it is to be understood that the invention is not limited to use in a loran receiver but may be utilized in other applications, as will be apparent to one skilled in the art.

In the drawing, the numeral 10 indicates generally a timing source including a oscillator and divider chain. The output from the divider chain is a series of pulses as indicated in Fig. 2a which are preferably timed to have twice the repetition frequency as the conventional loran repetition rate where the timing apparatus is used in a loran receiver. The oscillator and divider chain may be the same as described in the above-mentioned Frantz patent, in which the divider chain is arranged to provide output pulses at different selected frequencies as desired.

Also derived from the divider chain of the timing source 10 is a series of pulses as indicated in Fig. 2c having a repetition frequency of 1000 cycles per second for example. These pulses from the divider are coupled to a filter and amplifier circuit 12 which is tuned to the 1000 cycle per second fundamental frequency of the pulses derived from the divider. The output of the filter and amplifier 12 is a sine wave having the same frequency as the pulses derived from the timing source 10, namely, a 1000 cycles per second.

The amplified sine wave output from the amplifier 12 is coupled to a resolver-type phase shifter 14 which is preferably of a type described in Patent No. 2,627,598. The phase shifter is arranged to produce a phase shifted output at 18. The phase shifter 14 provides a continuously variable phase shift by means of a control knob 20 having associated therewith a calibrated dial 22 indicating the phase shift introduced between the phase shifted output at 18 and the reference output at 16. The two outputs at 16 and 18 are connected to a relay 24 which includes a single-pole double-throw switch 26 actuated by relay coil 28. While a mechanical relay switch is shown, an electronic switch may be used as well. The switch 26 selectively couples the reference signal at 16 or the phase shifted signal at 18 to a pulse generator 30, which reforms the input sine wave signal to sharp pulses. The output of the pulse generator 30 is a series of pulses as indicated in Figs. 2e and 2f, Fig. 2e representing the output when the reference signal is coupled to the pulse generator 30 by the switch 26 and the pulses of Fig. 2f representing the output when the phase shifted signal is coupled to the pulse generator 3 by the switch 26. While the two signals from the pulse generator 30 have the same repetition rate, they bear a different time relation to the reference pulses derived from the timer 10 and indicated in Fig. 2c.

The output at $a$ of the timer circuit 10 is coupled to a square wave generator 32, which may be an Eccles-Jordan circuit that is triggered from one stable state to another by successive trigger pulses from the timer circuit 10. The output of the square wave generator 32 is a square wave having the same frequency as the standard loran pulse repetition rate. The output of the square wave generator 32 is coupled to the relay coil 28 of the relay 24, so that the switch 26 acts to connect the reference signal and the phase shifted signal to the pulse generator alternately during successive half cycles of the square wave output of the generator 32.

The output of the square wave generator 32 is also coupled to an A pedestal delay 34 which may be a phantastron or a monostable multivibrator or similar circuit for generating a delayed output pulse at a predetermined time following the start of the negative half cycle of the square wave from square wave generator 32. The purpose of the A pedestal delay is to introduce a fixed delay between the pedestal and sweep on the loran receiver-indicator and has no direct function as far as the present invention is concerned. It is included for the sake of illustrating a timing apparatus, by way of example, that can be utilized directly in the receiver described in the above-mentioned Frantz patent. The output of the A pedestal delay is shown in Fig. 2d. The A pedestal delay includes a differentiating circuit and clipper on the input and the output. Thus the A pedestal delay is made to respond only to the leading edge of the negative-going half cycle of the square wave and to produce a trigger pulse out at the end of the delay interval.

The output of the square wave generator 32 is also coupled to a B pedestal delay 36 which preferably comprises a phantastron circuit. The phantastron circuit is well known in the radar art and is characterized by the fact that it produces a delayed output pulse in response to an input pulse, the amount of delay depending on a D.-C. bias applied to the circuit. Thus the B pedestal delay 36 is controlled by a potentiometer 38 connected across a D.-C. potential source 40. The wiper contact of the potentiomer 38 is mechanically linked to the phase shifter 14 and the manual control knob 20 to permit simultaneous adjustment of the delay time of the B pedestal delay 36 and the phase shift introduced by the phase shifter 14. The B pedestal delay 36 is provided with a differentiating network and clipper on the input whereby it is triggered by the leading edge of the positive-going half cycle of the square wave from the square wave generator 32, producing a delayed output pulse as shown in Fig. 2g which is delayed at least a half cycle at the loran repetition rate from the output of the A pedestal delay 34.

The output triggers from the A pedestal delay 34 and the B pedestal delay 36 are coupled to a selector 42, the output of which is coupled to a pedestal generator 44. The selector 42 may comprise a bistable multivibrator which is triggered to one stable state by the triggers from the A pedestal delay 34 and the B pedestal 36 and is triggered to its other stable state by the output pulses from the pulse generator 30.

Thus in operation the selector 42 is first triggered by an A pedestal delay pulse and then returned to its initial state by the next pulse from the pulse generator 30. The selector 42 is next triggered by an output pulse from the B delay 36 and returned to its initial state by the next output pulse from the pulse generator 30. By differentiating and clipping the output of the bistable multivibrator in the selector 42, negative pulses can be derived from the selector 42 which are synchronized with pulses from the pulse generator 30, as shown in Fig. 2h.

Selector 42 may alternatively be a gate operated by a monostable multivibrator which is triggered by the output pulses from the A pedestal delay 34 and the B pedestal delay 36. In this case the gate of the selector 42 is opened to pass the next pulse from the pulse generator 30. In either case it will be seen that the output triggers from the selector 42 are synchronized with the selected pulses from the pulse generator 30.

The pedestal generator 44 is identical with the pedestal generator 101 appearing in the loran receiver described in detail in the above-mentioned patent, the output of the pedestal generator being used to control a loran indicator as therein described.

In operation, it will be seen that the timing circuit described provides a time delay between the output triggers from the selector 42 which is accurately determined from the setting of the phase shifter 14 by the control knob 20. The dial 22 can be directly calibrated in microseconds since one turn of the control knob 20 represents 360° phase shift of a signal having a frequency of 1000 cycles per second, which corresponds to a period of 1000 microseconds. One reolution of the control knob 20 changes the time delay of the B pedestal delay 36 by 1000 microseconds through adjustment of the potentiometer 38. The number of revolutions of the control knob 20 is indicated on a suitable counter 46 mechanically linked to the control knob 20 by suitable linkage means (not shown). Thus the counter 46 counts in units of 1000 microseconds the delay between the triggers from the selector 42 while the indicating dial 22 shows the time delay in units of less than 1000 microseconds.

From the above description it will be seen that the various objects of the invention have been achieved by the provision of timing apparatus for generating local triggers which are accurately controlled in their time displacement. Bysuitable indicator means such as shown in the above-mentioned Frantz patent, these local triggers can be synchronized with received loran A and B pulses so that the indicated time delay between the locally generated pulses is an accurate measure of the time delay between the received loran A and B pulses.

Increased accuracy of the timing apparatus is assured by the fact that both the reference and delayed triggers are synchronized with the oscillator and divider timing circuit 10 through a common filter and amplifier 12, a common pulse generator 30, and selector 42. Thus the only phase shifts or time delays uncommon to both the reference pulse and the delay pulse is in the phase shifter itself. All other phase shift errors affect the reference and delayed triggers equally and are thereby cancelled out of the indicated delay measurement. However, the phase shifter 14 can be made relatively insensitive to temperature changes, for example, so that a high degree of accuracy can be maintained in setting the time delay interval between the reference pulse and the delayed pulse from the output of the selector 42. Slight changes in the delays introduced by the A pedestal delay and the B pedestal delay if kept within limits of several hundred microseconds cannot affect the accuracy of the triggers derived from the selector 42, since the A pedestal delay 34 and B pedestal delay 36 only function to select desired reference pulse and delay pulse from the succession of pulses produced by the pulse generator 30.

While the timing apparatus of Fig. 1 has been described as being particularly adapted for use in a loran receiver of the type described in the above-mentioned Patent No. 2,651,033 to Frantz; it is to be understood that it is not limited to such application but has general utility in generating trigger pulses at accurately determined delay time intervals. The A pedestal delay 34 may be eliminated if desired in general application of the timing apparatus and the relay 24 and the B pedestal delay may be controlled independently of the timer 10.

Other obvious modifications within the scope of the invention include the use of several phase shifters, instead of one as shown, with suitable switching means for successively coupling the outputs of the phase shifter to a common pulse generating circuit. In its broader aspect the invention is applicable whenever it is desired to generate a pair of pulses having a variable delay therebetween. By time sharing the pulse generator 30, which is a non-linear squaring circuit, errors due to the non-linearity where two such circuits are required to be balanced is obviated.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. In a loran receiver, apparatus for generating A and B pulses at a predetermined repetition frequency with an accurately controllable time delay between the A and B pulses, said apparatus comprising a local oscillator, a divider chain, means for deriving a first signal from said divider chain, a variable phase shifter responsive to said first signal for generating a second signal at the same frequency as the first signal but shifted in phase relative thereto, pulse generating means, switching means for selectively coupling said first and second signals to the pulse generating means for synchronizing the output pulses thereof respectively with the selected one of said first and second signals, square wave generating means responsive to the output of the divider chain for generating a square wave signal, the switching means being coupled to the output of the square wave generating means for actuating said switching means in response to the square wave signal, means responsive to the output of the square wave generating means for producing a first delayed trigger during the time the pulse generating means is coupled by the switching means to said first signal, means including a variable delay circuit responsive to the output of the square wave generating means for producing a second delay trigger during the time the pulse generating means is coupled by the switching means to said second signal, means for simultaneously actuating the variable phase shifter and variable delay circuit, whereby the change in delay time introduced by the delay circuit is maintained substantially equal to the time corresponding to the total cycles and fractions thereof of phase shift introduced by the phase shifter, and a selector circuit triggered by said first and second delayed triggers for selecting particular pulses from said pulse generating means and producing output pulses in time coincidence with the selected pulses from said pulse generating means.

2. Apparatus for generating A and B pulses at a predetermined repetition frequency with an accurately controllable time delay between the A and B pulses, said apparatus comprising a first alternating current signal source, a variable phase shifter responsive to said first signal for generating a second signal at the same frequency as the first signal but shifted in phase relative thereto, pulse generating means, switching means for selectively coupling said first and second signals to the pulse generating means for synchronizing the output pulses thereof respectively with the selected one of said first and second signals, square wave generating means for generating a square wave signal, the switching means being coupled to the output of the square wave generating means for actuating said switching means in response to the square wave signal, means responsive to the output of the square wave generating means for producing a first trigger during the time the pulse generating means is coupled by the switching means to said first signal, means including a variable delay circuit responsive to the output of the square wave generating means for producing a delay trigger during the time the pulse generating means is coupled by the switching means to said second signal, means for simultaneously actuating the variable phase shifter and variable delay circuit, whereby the change in delay time introduced by the delay circuit is maintained substantially equal to the time corresponding to the total cycles and fractions thereof of phase shift introduced by the phase shifter, and a selector circuit triggered by said first and delayed triggers for selecting particular pulses from said pulse generating means and producing output pulses in time coincidence with the selected pulses from said pulse generating means.

3. Apparatus for generating A and B pulses at a predetermined repetition frequency with an accurately controllable time delay between the A and B pulses, said apparatus comprising means for producing a first alternating current signal, a variable phase shifter responsive to said first signal for generating a second signal at the same frequency as the first signal but shifted in phase relative thereto, pulse generating means, switching means for selectively coupling said first and second signals to the pulse generating means for synchronizing the output pulses thereof respectively with the selected one of said first and second signals, means for producing a first trigger during the time the pulse generating means is coupled by the switching means to said first signal, means including a variable delay circuit for producing a delay trigger during the time the pulse generating means is coupled by the switching means to said second signal, means for simultaneously actuating the variable phase shifter and variable delay circuit, whereby the change in delay time introduced by the delay circuit is maintained substantially equal to the time corresponding to the total cycles and fractions thereof of phase shift introduced by the phase shifter, and a selector circuit triggered by said first and delayed triggers for selecting particular pulses from said pulse generating means and producing output pulses in time coincidence with the selected pulses from said pulse generating means.

4. Apparatus for generating pulses at a predetermined repetition frequency with an accurately controllable time delay between adjacent pulses, said apparatus comprising means for producing a first alternating current signal, a variable phase shifter responsive to said first signal for generating a second signal at the same frequency as the first signal but shifted in phase relative thereto, pulse generating means, switching means for selectively coupling said first and second signals to the pulse generating means for synchronizing the output pulses thereof respectively with the selected one of said first and second signals, gating means coupled to the pulse generating means for producing output pulses therefrom in response to selected pulses from the pulse generating means, means for triggering said gating means, said triggering means including a variable time delay circuit for selectively adjusting the time between successive triggering of the gating means, whereby selected pulses from the pulse generating means are selected by the gating means, the triggering means being synchronized with the switching means whereby the gating means selects successively a pulse derived from the first signal and pulse derived from the second signal, and means for linking the variable time delay circuit with the variable phase shifter to effect simultaneous adjustment thereof.

5. Apparatus for generating pulses at a predetermined repetition frequency with an accurately controllable time delay between adjacent pulses, said apparatus comprising means for producing a first alternating current signal, a variable phase shifter responsive to said first signal for generating a second signal at the same frequency as the first signal but shifted in phase relative thereto, pulse generating means, switching means for selectively coupling said first and second signals to the pulse generating means for synchronizing the output pulses thereof respectively with the selected one of said first and second signals, gating means coupled to the pulse generating means for producing output pulses therefrom in response to selected pulses from the pulse generating means, and means for triggering said gating means, said triggering means including a variable time delay circuit for selectively adjusting the time between successive triggering of the gating means, whereby selected pulses from the pulse generating means are selected by the gating means, the triggering means being synchronized with the switching means whereby the gating means selects successively a pulse derived from the first signal and pulse derived from the second signal.

6. Apparatus for generating pulses at a predetermined repetition frequency with an accurately controllable time delay between adjacent pulses, said apparatus comprising means for producing a first alternating current signal, a variable phase shifter responsive to said first signal for generating a second signal at the same frequency as the first signal but shifted in phase relative thereto, pulse generating means, switching means for selectively coupling said first and second signals to the pulse generating means for synchronizing the output pulses thereof respectively with the selected one of said first and second signals, and gating means coupled to the pulse generating means for producing output pulses therefrom in response to selected pulses from the pulse generating means.

7. Apparatus for generating pulses at a predetermined repetition frequency with an accurately controllable time delay between adjacent pulses, said apparatus comprising means for producing a first alternating current signal, a variable phase shifter responsive to said first signal for generating a second signal at the same frequency as the first signal but shifted in phase relative thereto, pulse generating means, and switching means for selectively coupling said first and second signals to the pulse generating means for synchronizing the output pulses thereof respectively with the selected one of said first and second signals.

No references cited.